(12) United States Patent
Mitchell, Jr. et al.

(10) Patent No.: US 7,447,386 B2
(45) Date of Patent: Nov. 4, 2008

(54) CASCADED MODULATOR SYSTEM AND METHOD FOR QKD

(75) Inventors: J. Howell Mitchell, Jr., Amherst, NH (US); Harry Vig, North Billerica, MA (US); Michael J. LaGasse, Nahant, MA (US)

(73) Assignee: Magiq Technologies, Inc, New York, NY (US)

( * ) Notice: Subject to any disclaimer, the term of this patent is extended or adjusted under 35 U.S.C. 154(b) by 0 days.

(21) Appl. No.: 11/360,544

(22) Filed: Feb. 23, 2006

(65) Prior Publication Data

US 2007/0196041 A1    Aug. 23, 2007

(51) Int. Cl.
*G02F 1/01* (2006.01)
*H04B 10/04* (2006.01)
*H04K 1/00* (2006.01)

(52) U.S. Cl. ............... 385/1; 385/3; 385/4; 385/11; 380/256; 380/263; 398/188

(58) Field of Classification Search ............... 359/161, 359/177, 183; 398/188; 385/11, 37, 1–3, 385/14, 40; 380/256, 263
See application file for complete search history.

(56) References Cited

U.S. PATENT DOCUMENTS

| | | | |
|---|---|---|---|
| 6,538,787 B1 * | 3/2003 | Moeller et al. ............... 398/158 |
| 6,801,626 B1 * | 10/2004 | Nambu ............... 380/256 |
| 6,871,023 B2 * | 3/2005 | Atmur et al. ............... 398/152 |
| 2003/0142384 A1 | 7/2003 | Kurebayashi et al. |
| 2003/0184838 A1 | 10/2003 | Akiyama et al. |
| 2004/0032954 A1 * | 2/2004 | Bonfrate et al. ............... 380/263 |
| 2004/0076439 A1 * | 4/2004 | Lee et al. ............... 398/183 |
| 2004/0190910 A1 | 9/2004 | Akiyama et al. |
| 2005/0008374 A1 | 1/2005 | Taneda et al. |
| 2005/0036791 A1 | 2/2005 | Gunn et al. |
| 2005/0074245 A1 * | 4/2005 | Griffin ............... 398/188 |
| 2006/0093377 A1 | 5/2006 | Choudhary et al. |
| 2006/0245763 A1 * | 11/2006 | Ishida et al. ............... 398/186 |

* cited by examiner

*Primary Examiner*—Brian Healy
*Assistant Examiner*—Guy G Anderson
(74) *Attorney, Agent, or Firm*—Opticus IP Law PLLC

(57) ABSTRACT

A cascaded modulator system (20) and method for a QKD system (10) is disclosed. The modulator system includes to modulators (M1 and M2) optically coupled in series. A parallel shift register (50) generates two-bit (i.e., binary) voltages (L1, L2). These voltage levels are adjusted by respective voltage adjusters (30-1 and 30-2) to generate weighted voltages (V1, V2) that drive the respective modulators. An electronic delay element (40) that matches the optical delay between modulators provides for modulator timing (gating). The net modulation ($M_{NET}$) imparted to an optical signal (60) is the sum of the modulations imparted by the modulators. The modulator system provides four possible net modulations based only on binary voltage signals. This makes for faster and more efficient modulation in QKD systems and related optical systems when compared to using quad-level voltage signals to drive a single modulator.

12 Claims, 3 Drawing Sheets

CASCADED MODULATOR SYSTEM AND METHOD FOR QKD

TECHNICAL FIELD OF THE INVENTION

The present invention relates to modulation in quantum cryptography, and in particular relates to modulators used in quantum key distribution (QKD) systems.

BACKGROUND ART

QKD involves establishing a key between a sender ("Alice") and a receiver ("Bob") by using either single-photons or weak (e.g., 0.1 photon on average) optical signals (pulses) called "qubits" or "quantum signals" transmitted over a "quantum channel." Unlike classical cryptography whose security depends on computational impracticality, the security of quantum cryptography is based on the quantum mechanical principle that any measurement of a quantum system in an unknown state will modify its state. As a consequence, an eavesdropper ("Eve") that attempts to intercept or otherwise measure the exchanged qubits will introduce errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33.

Most QKD systems utilize modulators to randomly encode the quantum signals shared between Alice and Bob. The typical modulator is a standard lithium niobate phase modulator, such as is available from Covega Corp. of Jessup, Md. or EOspace Inc. of Redmond, Wash. However, as the quantum bit rates of QKD systems increase, it becomes more and more difficult to drive lithium niobate phase modulators at the higher speeds needed. In a QKD system, it is necessary to have the ability to quickly and cleanly jump between four distinct modulation voltage values that correspond to four phase modulations (e.g., $+3\pi/4$, $+\pi/4$, $-\pi/4$ and $-3\pi/4$). It is preferred, however, to employ bi-level (or binary) electrical signals for modulation rather than quad-level signals because they are relatively fast and inexpensive to implement as compared to quadrature-level signals.

SUMMARY OF THE INVENTION

A first aspect of the invention is an optical modulator system that includes first and second optical modulators optically coupled in series, and first and second voltage adjusters respectively electrically coupled to the first and second optical modulators. A parallel shift register is electrically coupled to the first and second voltage adjusters and provides respective binary voltages to the voltage adjusters. The voltage adjusters act on the binary voltages to create first and second voltages corresponding to desired phase modulation values for the first and second optical modulators. The result is four possible net modulations based on binary voltage signals rather than quadrature-level signals.

A second aspect of the invention is a method of optically modulating a quantum signal in a quantum key distribution (QKD) station of a QKD system. The method includes passing the quantum signal through a first optical modulator and then a second optical modulator. The method also includes activating the first and second optical modulators with respective first and second binary voltages that correspond to desired modulations imparted by the first and second modulators, respectively, so as to randomly impart one of four possible net modulations to each quantum signal.

Figure 1:
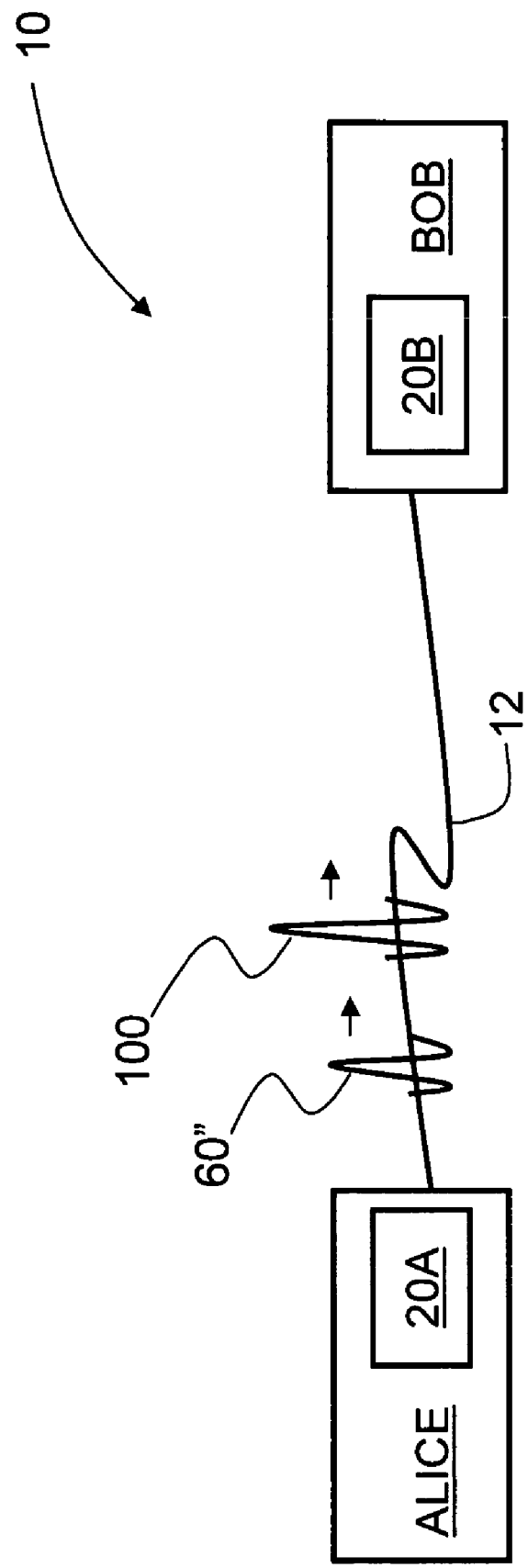
FIG. 1 is a schematic diagram of a QKD system 10 that includes two QKD stations, ALICE and BOB, optically coupled by an optical fiber link.

The various elements depicted in the drawing are merely representational and are not necessarily drawn to scale. Certain sections thereof may be exaggerated, while others may be minimized. The drawing is intended to illustrate an example embodiment of the invention that can be understood and appropriately carried out by those of ordinary skill in the art.

DETAILED DESCRIPTION OF THE INVENTION

FIG. 1 is a schematic diagram of a QKD system 10 that includes two QKD stations, ALICE and BOB optically coupled using, for example, an optical fiber link 12. ALICE and BOB each include a number of optical and electronic elements that are known in the prior art and thus not shown, along with respective identical modulator assemblies 20 according to the present invention and denoted as 20A at ALICE and 20B at BOB.

Figure 2:
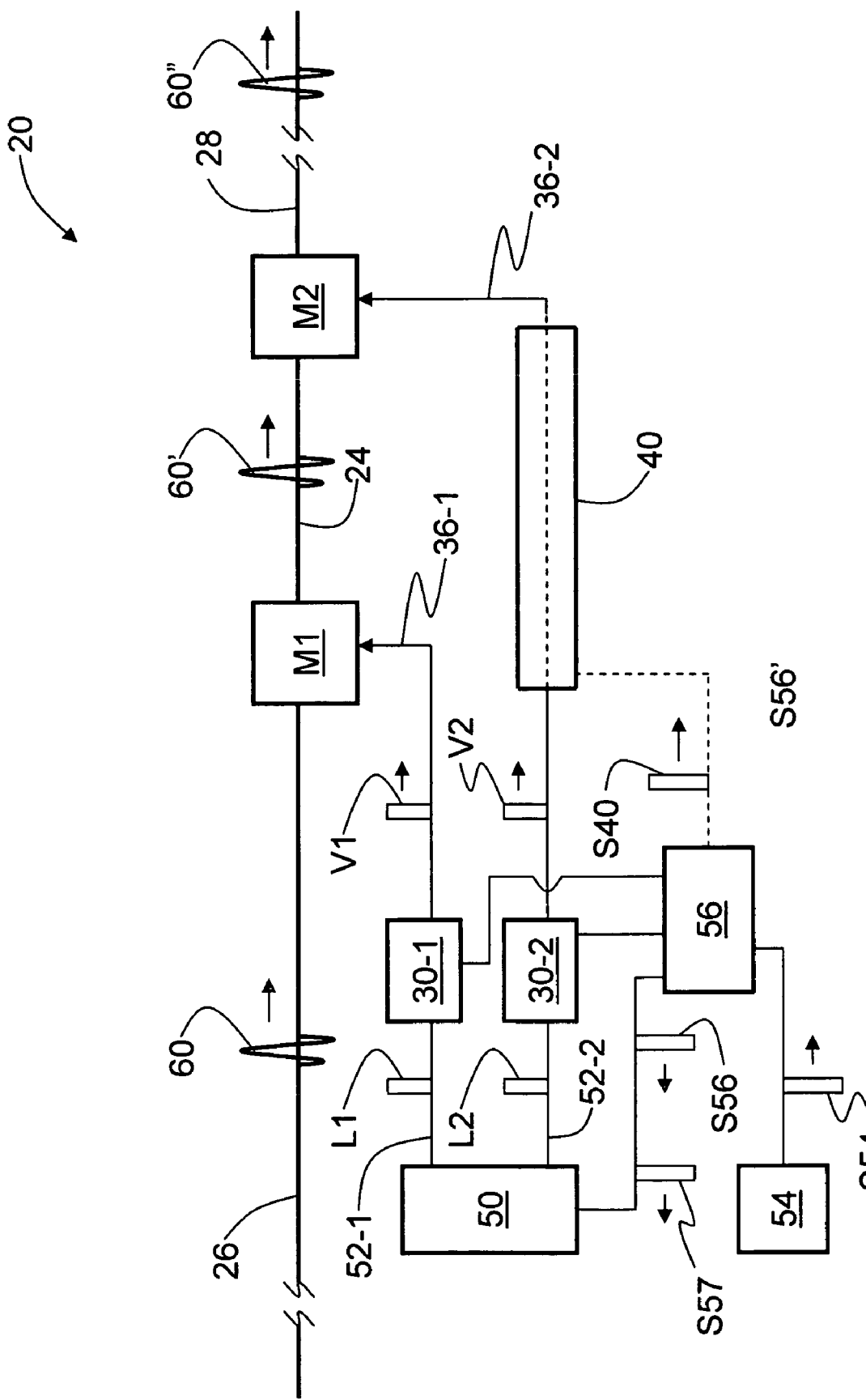
FIG. 2 is a schematic diagram of an example embodiment of the modulator system of FIG. 1 according to the present invention.

FIG. 2 is a schematic diagram of an example embodiment of modulator system 20 according to the present invention. Modulator system 20 includes a first optical modulator M1 optically coupled to a second optical modulator M2, e.g., by an optical fiber section 24. First and second modulators M1 and M2 are, for example, lithium niobate phase modulators, such as those commercially available from Eospace, Inc. of Redmond, Wash. or Covega, Inc. of Jessup, Md. An input optical fiber 26 is optically coupled to modulator M1 and an output optical fiber 28 is optically coupled to modulator M2. In an example embodiment where modulator system 20 is at BOB as system 20B, input optical fiber 26 is optical fiber link 12.

Modulator system 20 includes voltage adjusters 30-1 and 30-2 respectively electrically coupled to modulators M1 and M2 via electrical lines 36-1 and 36-2. Electrical line 36-1 includes an electrical delay element 40, such as a coaxial delay line. In an example embodiment, delay element 40 is adjustable to adjust the amount of delay. Voltage adjusters 30-1 and 30-2 are respectively electrically connected to a low-skew, low-jitter parallel shift register 50 via electrical lines 52-1 and 52-2.

In an example embodiment, modulator system 20 also includes a random number generator (RNG) 54 electrically coupled to a controller 56, such as a field-programmable gate array. Controller 56 is electrically coupled to parallel shift register 50 and voltage adjusters 30-1 and 30-2, and that is adapted (e.g., programmed) to control the operation of the modulator system. In the example embodiment where electrical delay element 40 is adjustable, controller 56 is electrically coupled thereto (dashed line) and adapted to adjust the amount of electrical delay via a control signal S40.

In the operation of modulator system 20, an optical signal 60 to be modulated travels into modulator system 20 via input optical fiber 26. In an example embodiment, optical signal 60 is a single-photon-level quantum signal (i.e., single photons or optical pulses having one photon or less, on average, such as 0.1 photons on average). In an example QKD system such as QKD system 10, optical signal 60 needs to be modulated with four different phase modulations (e.g., +3π/4, +π/4, −π/4 and −3π/4) generated by four corresponding drive voltage values.

In the present invention, the four different drive voltage values are determined by a two-bit binary word L1 and L2 (i.e., "logic" or "binary" voltages) found at the output of parallel shift register 50. The binary (voltage) levels L1 and L2 are then adjusted (either amplified or attenuated) by respective voltage adjusters 30-1 and 30-2 to generate weighted voltage outputs V1 and V2. In an example embodiment, the weighting is at a nominal ratio of two to one, but this need to be the case. The weighting is adjusted so that four different net modulation values $M_{NET}$ can be achieved using only two binary voltage levels L1 and L2.

Weighted voltage signals V1 and V2 are provided to respective modulators M1 and M2 via respective electrical lines 36-1 and 36-2. The optical propagation delay of optical signal 60 over optical fiber section 24 optically connecting the two modulators is compensated by electrical delay element 40. Delay element 40 is adapted to have exactly the same delay as the optical delay between the modulators. In this manner, the low-skew output of the shift register can be used to best advantage. The delay also ensures that modulators M1 and M2 are independently activated (gated) precisely when optical signal 60 is passing through the particular modulator.

Thus, optical signal 60 traveling on input optical fiber 26 is first modulated by modulator M1, thereby creating once-modulated optical signal 60'. The optical signal then travels over optical fiber section 24 to modulator M2, which modulates the once-modulated optical signal 60', thereby creating a twice-modulated optical signal 60", which exits modulator system via output optical fiber 28. The net modulation $M_{NET}$ imparted to optical signal 60" is given by the sum of the modulations of modulators M1 and M2, with the electrical delay line causing the optical delay to appear as if the modulators are acting at the same time rather than serially.

Figure 3:
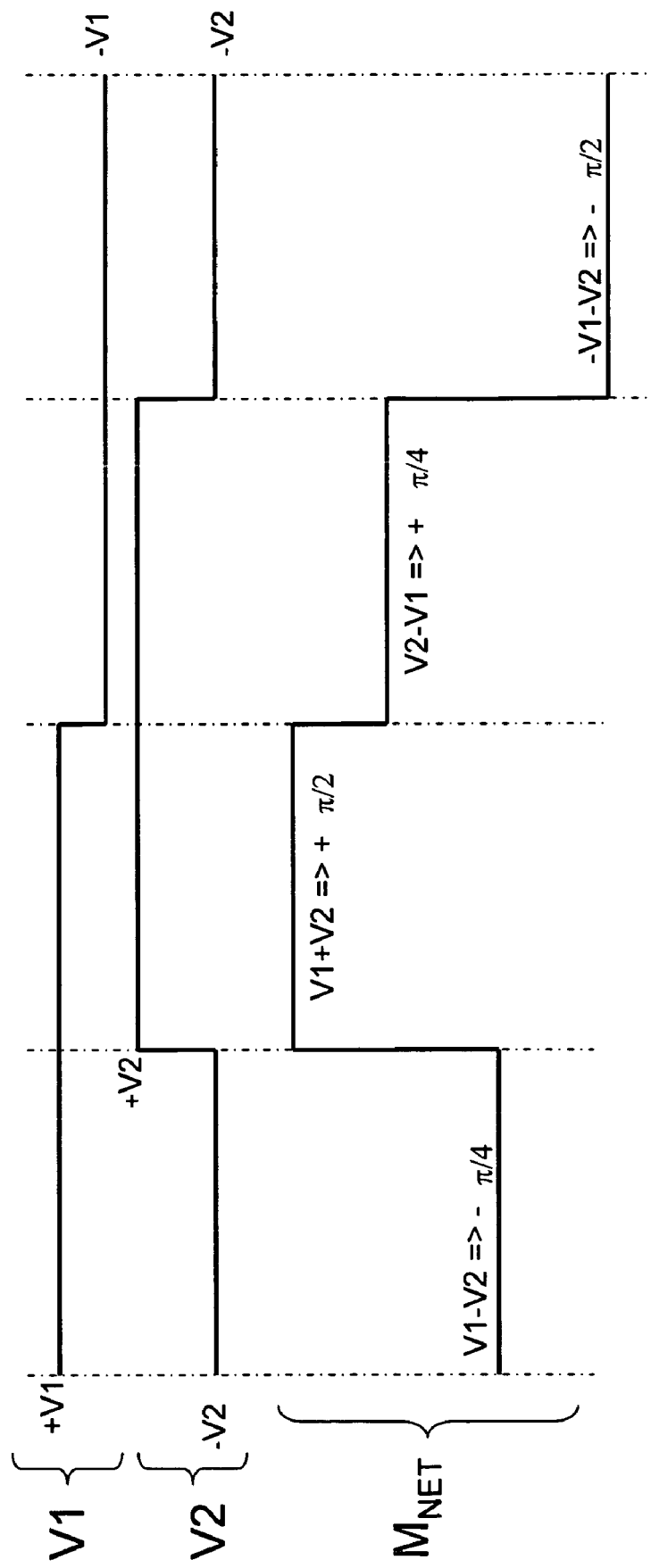
FIG. 3 is schematic diagram illustrating the two voltage signals V1 and V2, along with the corresponding net output modulation $M_{NET}$ of modulators M1 and M2, showing an example of how four different output modulations are generated based on binary voltage values for V1 and V2.

FIG. 3 is schematic diagram illustrating the two voltage signals V1 and V2, along with the corresponding net output modulation $M_{NET}$ of modulators M1 and M2, showing an example of how four different output modulations are generated based on binary voltage values for V1 and V2. In the example timing diagram, ±V1 corresponds to phases ±π/4 and ±V2 corresponds to phases ±3π/4. For voltage combination +V1-V2, the net modulation MNET is π/4. For voltage combination V1+V2, the net modulation MNET is π/2. For voltage combination V2-V1, the net modulation MNET is π/4. For voltage combination −V1-V2, the net modulation MNET is −π/2.

In an example embodiment where the modulation needs to be random, such as in establishing a key between BOB and ALICE in QKD system 10, random number generator (RNG) 54 sends a random number in the form of a RNG signal S54 to controller 56. The random number represented by RNG signal S54 is received by controller 56, which then sends an RNG signal S56 to parallel shift register 50. RNG signal S54 goes through controller 56 so that the controller can generate RNG signal S56 having enhanced randomness relative to RNG signal S54. This is accomplished, for example, by XOR-ing the random numbers of RNG signals S54 with a pseudorandom sequence stored in or provided to controller 56.

In another example embodiment, controller 56 sends control signals S57 to parallel shift register 50. In an example embodiment, control signals S57 correspond to the quantum key established between ALICE and BOB and stored in controller 56. Control signals S57 allow for modulator system 20 to encode messages using multi-photon pulses, as opposed to random phase modulation of single-photon-level pulses used to establish the quantum key.

With reference again to FIG. 1, ALICE and BOB respectively utilize modulator systems 20A and 20B to randomly encode quantum signals at Alice and measure the quantum signals at BOB to establish a quantum key between them using known techniques. In an example embodiment where ALICE and BOB have the ability to send non-quantum optical signals 100, the quantum key is then used to drive modulator system 20A and/or 20B as described above (using control signals S57) to encode non-quantum optical signals in order to exchange an quantum-encoded message.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An optical modulator system for modulating an input optical signal, comprising:
   first and second optical modulators optically coupled in series so as to sequentially operate on the input optical signal without splitting the input optical signal prior to said first modulator;
   first and second voltage adjusters respectively electrically coupled to the first and second optical modulators;
   a parallel shift register electrically coupled to the first and second voltage adjusters so as to provide respective binary voltages to the voltage adjusters; and
   wherein the voltage adjusters act on the binary voltages to create first and second voltages corresponding to desired phase modulation values for the first and second optical modulators so as to provide four possible net modulations.

2. The optical modulator system of claim 1, further including a random number generator electrically coupled to the parallel shift register so as to randomize the binary voltage output of the parallel shift register so that the net modulation is randomly selected from the four possible net modulations.

3. The modulator system of claim 1, including an electrical delay element between the second voltage adjuster and the second optical modulator, wherein the electrical delay element provides an electrical delay equal to an optical delay between the first and second optical modulators.

4. The optical modulator system of claim 1, including an input optical fiber optically coupled to the first optical modulator, and an output optical fiber optically coupled to the second optical modulator.

5. The optical modulator system of claim 1, wherein the four possible net modulations are either (a)±3π/4 and ±π/4 or (b)±π/2 and ±π/4.

6. The optical modulator system of claim 1, wherein the first and second optical modulators are optically coupled by a section of optical fiber.

7. The optical modulator system of claim 2, wherein the electrical delay element is configured so that the electrical delay is adjustable.

8. An optical modulator system for modulating an input optical signal, comprising:

first and second optical modulators optically coupled in series and having an optical delay therebetween so as to sequentially operate on the input optical signal without splitting the input optical signal prior to said first modulator;

first and second voltage adjusters respectively electrically coupled to the first and second optical modulators;

an electrical delay element between the second voltage adjuster and the second optical modulator and configured to provide an electrical delay that compensates for the optical delay between the first and second optical modulators;

a parallel shift register electrically coupled to the first and second voltage adjusters so as to provide respective first and second binary voltages to the first and second voltage adjusters; and wherein the voltage adjusters act on the first and second binary voltages to create first and second phase modulation voltages corresponding to desired first and second phase modulation values for the first and second optical modulators so that the optical modulator system can provide four possible net phase modulations.

9. The optical modulator system of claim 8, wherein the electrical delay element is configured so that the electrical delay is adjustable.

10. The optical modulator system of claim 8, further including a random number generator electrically coupled to the parallel shift register so as to randomize the binary voltage output of the parallel shift register so that the net modulation is randomly selected from the four possible net modulations.

11. The optical modulator system of claim 8, further comprising an input optical fiber optically coupled to the first optical modulator, and an output optical fiber optically coupled to the second optical modulator.

12. The optical modulator system of claim 8, wherein the first and second optical modulators are optically coupled by a section of optical fiber.

* * * * *

UNITED STATES PATENT AND TRADEMARK OFFICE
CERTIFICATE OF CORRECTION

PATENT NO. : 7,447,386 B2 Page 1 of 1
APPLICATION NO. : 11/360544
DATED : November 4, 2008
INVENTOR(S) : Mitchell, Vig and LaGasse It is certified that error appears in the above-identified patent and that said Letters Patent is hereby corrected as shown below:

In column 3, line 57, replace "$\pi/4$" with: $-\pi/4$

Signed and Sealed this

Twenty-third Day of December, 2008

JON W. DUDAS
*Director of the United States Patent and Trademark Office*